United States Patent
Yajima

(10) Patent No.: US 9,644,727 B2
(45) Date of Patent: May 9, 2017

(54) WAVE GEAR DEVICE AND HOLLOW ROTATING ACTUATOR

(71) Applicant: Harmonic Drive Systems Inc., Tokyo (JP)

(72) Inventor: Yoshikazu Yajima, Azumino (JP)

(73) Assignee: HARMONIC DRIVE SYSTEMS INC., Shinagawa, Tokyo (JP)

(*) Notice: Subject to any disclaimer, the term of this patent is extended or adjusted under 35 U.S.C. 154(b) by 596 days.

(21) Appl. No.: 14/135,051

(22) Filed: Dec. 19, 2013

(65) Prior Publication Data

US 2014/0283638 A1 Sep. 25, 2014

Related U.S. Application Data

(63) Continuation of application No. PCT/JP2013/001882, filed on Mar. 19, 2013.

(51) Int. Cl.
| | |
|---|---|
| F16H 49/00 | (2006.01) |
| H02K 7/116 | (2006.01) |
| H02K 11/21 | (2016.01) |
| F16H 57/029 | (2012.01) |
| H02K 5/12 | (2006.01) |

(52) U.S. Cl.
CPC .......... *F16H 49/001* (2013.01); *H02K 7/116* (2013.01); *H02K 11/21* (2016.01); *F16H 57/029* (2013.01); *H02K 5/12* (2013.01); *Y10T 74/19642* (2015.01)

(58) Field of Classification Search
CPC .. F16H 49/001; F16H 57/0454; F16H 57/029; H02K 7/116

USPC ........................................................... 74/640
See application file for complete search history.

(56) References Cited

U.S. PATENT DOCUMENTS

| | | | | |
|---|---|---|---|---|
| 6,221,505 B1* | 4/2001 | Shirai | ................... | B23K 26/28 228/153 |
| 2002/0017160 A1* | 2/2002 | Kiyosawa | ............. | F16H 49/001 74/640 |
| 2004/0100734 A1* | 5/2004 | Koyama | ................. | F16C 19/54 360/265.2 |
| 2009/0108691 A1* | 4/2009 | Yoshikawa | ........... | F16C 17/105 310/90 |
| 2011/0023990 A1* | 2/2011 | Yano | ................... | B21C 37/0811 138/156 |
| 2014/0126167 A1* | 5/2014 | Bozorgi | ............. | B81C 1/00269 361/760 |

FOREIGN PATENT DOCUMENTS

| | | | |
|---|---|---|---|
| EP | 1 128 094 | * | 8/2001 |
| JP | 2000-009191 A | | 1/2000 |
| JP | 2001-304382 A | | 10/2001 |
| JP | 2001-336588 A | | 12/2001 |
| JP | 2002-021866 A | | 1/2002 |

(Continued)

*Primary Examiner* — William C Joyce
(74) *Attorney, Agent, or Firm* — Buchanan Ingersoll & Rooney PC

(57) ABSTRACT

In a wave gear device, the inner race and the boss are fixed together by a laser welded part formed along the entire periphery thereof. The laser welded part also functions as an oil seal for sealing the inner race and the boss. The boss and the inner race are fixed together in a manner that a required axial length is short, and that machining and assembling steps are reduced. Oil seal members are not required to seal the boss and the inner race.

6 Claims, 4 Drawing Sheets

(56) References Cited

FOREIGN PATENT DOCUMENTS

| JP | 2002-031150 A | | 1/2002 |
|---|---|---|---|
| JP | 2006-144971 | * | 6/2006 |
| JP | 2006-144971 A | | 6/2006 |

* cited by examiner

WAVE GEAR DEVICE AND HOLLOW ROTATING ACTUATOR

TECHNICAL FIELD

The present invention relates to a wave gear device comprising a bearing through which a flexible externally toothed gear is rotatably supported on a rigid internally toothed gear, and also relates to a hollow rotating actuator having the wave gear device. More specifically, the present invention relates to a structure for fixing a bearing and a flexible externally toothed gear of a wave gear device.

BACKGROUND ART

A wave gear device commonly used as a reduction drive comprises a device housing, a rigid internally toothed gear, a flexible externally toothed gear, and a wave generator. The rigid internally toothed gear is fixed to the device housing. The flexible externally toothed gear is supported by the device housing in a rotatable state via a bearing such as a cross roller bearing.

A cup-type wave gear device having a cup-shaped flexible externally toothed gear is a known example of a wave gear device. A cup-shaped flexible externally toothed gear comprises a flexible cylindrical barrel part, a diaphragm extending inward from one end of the barrel part, and a rigid boss formed as a continuation of the internal peripheral edge of the diaphragm. External teeth are formed in the external peripheral surface portion of the cylindrical barrel part on the side having the open end. In a flexible externally toothed gear of this configuration, the rigid boss is fixed to the inner race of the bearing.

Known examples of a structure for fixing the rigid boss of the flexible externally toothed gear and the inner race of the bearing include fixing structures that rely on screws (Patent Documents 1 and 2), fixing structures that use screws and knock pins (Patent Documents 3 and 4), and fixing adhesive-supplementing structures to fixing structures that rely on a screw and knock pins (Patent Document 4).

A known example of a hollow rotating actuator is one configured from a hollow motor and a cup-shaped wave gear device. In such a hollow rotating actuator, a sleeve is disposed on the inner side of a hollow motor shaft, and oil is prevented from leaking from the wave gear device into the hollow part (Patent Documents 5 and 6).
Patent Document 1: JP-A 2002-31150
Patent Document 2: JP-A 2002-21866
Patent Document 3: JP-A 2001-336588
Patent Document 4: JP-A 2000-9191
Patent Document 5: JP-A 2006-144971
Patent Document 6: JP-A 2001-304382

In a conventional fixing structure in which a rigid boss of a flexible externally toothed gear and a bearing inner race are fixed by screws, a sufficient screwed amount must be ensured between the two components in order to achieve sufficient fixing strength. Because the axial length of the screw-fixed portion cannot be shortened to a predetermined value or less, it is an obstacle to shortening the axial length of the wave gear device and flattening the wave gear device. Also necessary are operations such as machining a male screw into the external peripheral surface of the rigid boss, machining a female screw into the internal peripheral surface of the bearing inner race, and assembling the two components by screwing them together. This causes the problem of numerous component machining steps and assembling steps.

SUMMARY OF THE INVENTION

With the foregoing in view, it is an object of the present invention to provide a wave gear device whereby the rigid boss of a flexible externally toothed gear and a bearing inner race can be fixed by a simple configuration, and the two components can be reliably sealed. Another object of the present invention is to provide a hollow rotating actuator comprising this new wave gear device.

According to the present invention, there is provided a wave gear device comprising:
   a rigid internally toothed gear;
   a flexible externally toothed gear;
   a wave generator;
   a bearing for rotatably supporting the flexible externally toothed gear on the rigid internally toothed gear; and
   a first welded part for fixing a rigid boss in the flexible externally toothed gear to an inner race of the bearing,
   the first welded part being a full-circle welded part in which the boss and the inner race are sealed together in a liquid-tight state.

The first welded part is preferably laser welded.

The wave gear device of the present invention may be constituted so that it comprises:
   a device housing; and
   an inner race center through-hole formed in the inner race of the bearing, wherein
   the rigid internally toothed gear is fixed to an internal periphery of the device housing;
   the flexible externally toothed gear is disposed inside the rigid internally toothed gear and is rotatably supported on the device housing via the bearing;
   the wave generator is disposed inside the flexible externally toothed gear;
   the boss of the flexible externally toothed gear is mounted on the inner race center through-hole of the inner race;
   an end surface of the inner race and an end surface of the boss are both exposed outside in a device axial direction; and
   the first welded part is formed around an entire periphery in a region between an internal peripheral surface of the inner race and an external peripheral surface of the boss on a side of the end surface of the boss.

The inner race of the bearing and the boss of the flexible externally toothed gear are fixed to each other by the first welded part, e.g. by a first welded part made from laser welding. Therefore, the axial lengths of both these components can be shortened in comparison with cases in which the components are fixed by screws. Although a welding step is needed for both components, a screwing process of both components is not needed, nor is there a need for an assembly step of screwing one component into another component.

Furthermore, because the first welded part is full-circle welded, the first welded part functions as an oil seal and oil is prevented from leaking from between the inner race and the boss. There is no need to dispose a separate oil seal. Additionally, the work of welding the inner race and the boss can be performed in a simple manner because the welded region of the inner race and the boss is exposed either in the front end side or rear end side of the device in the axial device direction.

Consequently, according to the present invention, the overall time for machining the inner race and the boss can be shortened, the number of steps for assembling the two components can be reduced, and the number of assembled components can be reduced.

The hollow wave gear device according to the present invention has a first hollow part extending through the wave generator in the direction of the axial center of the device, a second hollow part extending through the boss in the direction of the axial center of the device, and a sleeve disposed in a state of passing through the first and second hollow parts.

In this case, the wave gear device preferably has a second welded part for fixing the sleeve to the boss, and the second welded part is preferably a full-circle welded part wherein the sleeve and the boss are sealed together in a liquid-tight state. The second welded part is also preferably formed on the side of the end surface of the boss.

With the above configuration, the sleeve can be fixed to the boss in a simple manner. Oil can also be prevented from leaking from between the boss and the sleeve. Further, the work of welding the sleeve and the boss can be performed in a simple manner because the welded region of the sleeve and the boss is exposed either in the front end side or rear end side of the device in the axial device direction.

Next, a hollow rotating actuator of the present invention characterized in comprising:
  a motor disposed in a rear side of the actuator, and a wave gear device disposed in a front side of the actuator, the motor and the wave gear device being disposed coaxially; wherein
  the motor has a motor housing and a hollow motor shaft protruding to the front side of the actuator from a front end plate of the motor housing;
  the wave gear device has a device housing fixed to the motor housing, a bearing, a rigid internally toothed gear fixed to the internal periphery of the device housing, a flexible externally toothed gear disposed on the inner side of the rigid internally toothed gear and rotatably supported in the device housing via the bearing, and a wave generator disposed on the inner side of the flexible externally toothed gear;
  the flexible externally toothed gear has a cylindrical barrel part having an open end in the side near the motor, a diaphragm extending radially inward from the end of the cylindrical barrel part on the side opposite the open end, an annular rigid boss formed as a continuation of the internal peripheral edge of the diaphragm, and external teeth formed in the external peripheral surface portion of the cylindrical barrel part on the side having the open end;
  a shaft distal end of the hollow motor shaft protruding forward from the front end plate extends into the cylindrical barrel part of the flexible externally toothed gear;
  the wave generator has a cylindrical rigid plug fixed to the external periphery of the shaft distal end;
  the bearing has an outer race fixed to the end of the device housing on the side near the front of the actuator, and an inner race having a center through-hole in which the boss is mounted;
  the annular end surface of the inner race on the side near the front of the actuator and the annular end surface of the boss on the side near the front of the actuator are both exposed in the front end side of the actuator;
  a first laser welded part is formed around the entire periphery between the internal peripheral surface of the inner race and the external peripheral surface of the boss, in the region on the front end side of the actuator;
  the boss is fixed to the inner race by the first laser welded part; and
  the internal peripheral surface of the inner race and the external peripheral surface of the boss are sealed together in a liquid-tight state by the first laser welded part.

Preferably, the hollow rotating actuator of the present invention comprises a sleeve passing through the hollow part of the hollow motor shaft, the hollow part of the boss, and the hollow part of the wave generator, and extending from the actuator front end surface to the actuator rear end surface, wherein
  an actuator hollow part opening in the actuator front end and the actuator rear end is formed by the internal peripheral surface of the sleeve;
  a second laser welded part is formed around the entire periphery between the external peripheral surface of the front end and the internal peripheral surface of the boss, which are exposed in the actuator front end in the sleeve;
  the front end part of the sleeve is fixed to the boss by the second laser welded part; and
  the external peripheral surface of the front end part and the internal peripheral surface of the boss are sealed together in a liquid-tight state by the second laser welded part.

The hollow rotating actuator of the present invention preferably comprises:
  a first oil seal for sealing together a rear end part of the sleeve exposed in the side at the actuator rear end, and the motor housing rear end plate which defines the actuator rear end;
  a second oil seal for sealing together the front end plate of the motor housing and the hollow motor shaft; and
  a third oil seal for sealing together the rigid plug and the boss.

Preferably, the hollow rotating actuator of the present invention comprises:
  an annular outer seal mount attached to the end surface of the boss on the side near the rear end of the actuator; and
  a cylindrical inside seal mount extending forward in the actuator along the external peripheral surface of the sleeve from the end surface of the rigid plug on the side near the front end of the actuator;
  the third oil seal being mounted between the outer seal mount and the inner seal mount.

BEST MODE FOR CARRYING OUT THE INVENTION

An embodiment of a hollow rotating actuator to which the present invention is applied is described below with reference to the drawings.

Figure 1A:
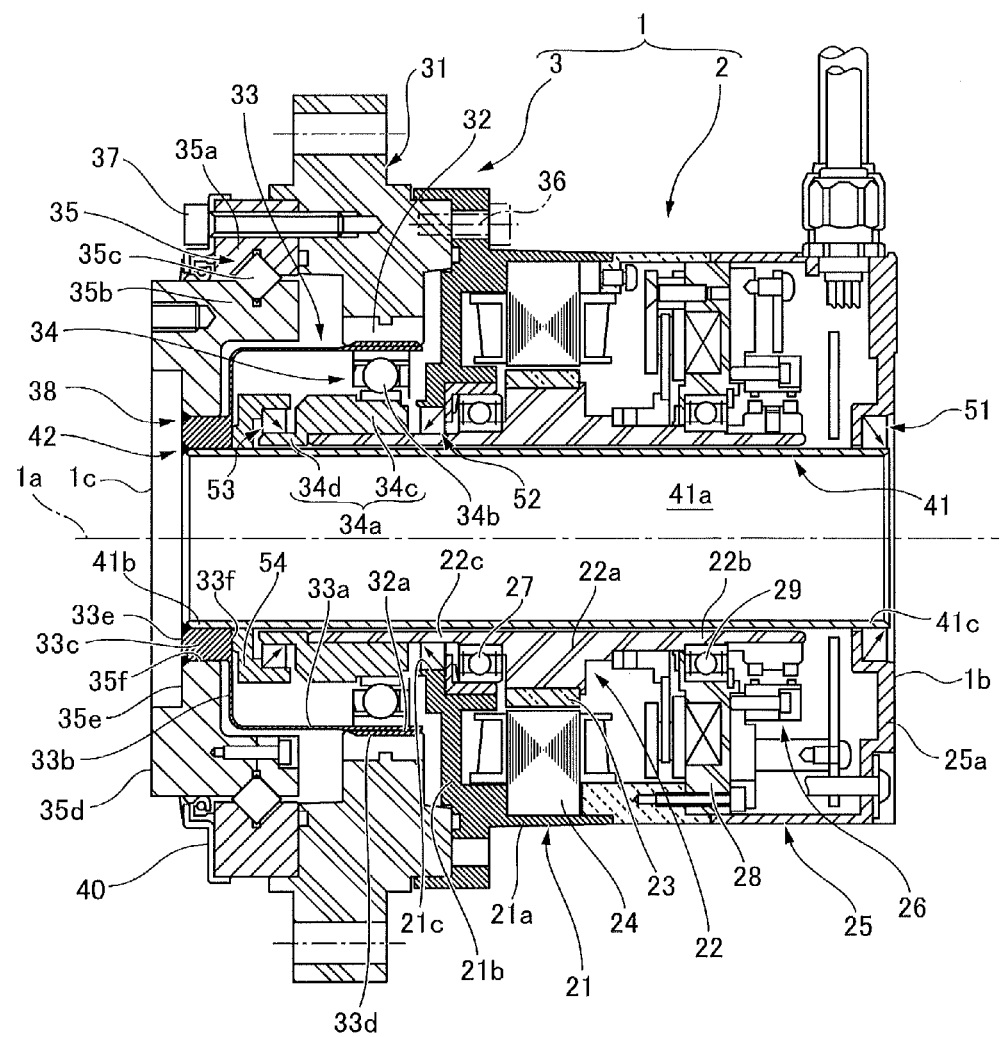
FIG. 1A is a schematic cross-sectional view of a hollow rotating actuator to which the present invention is applied.
Figure 1B:
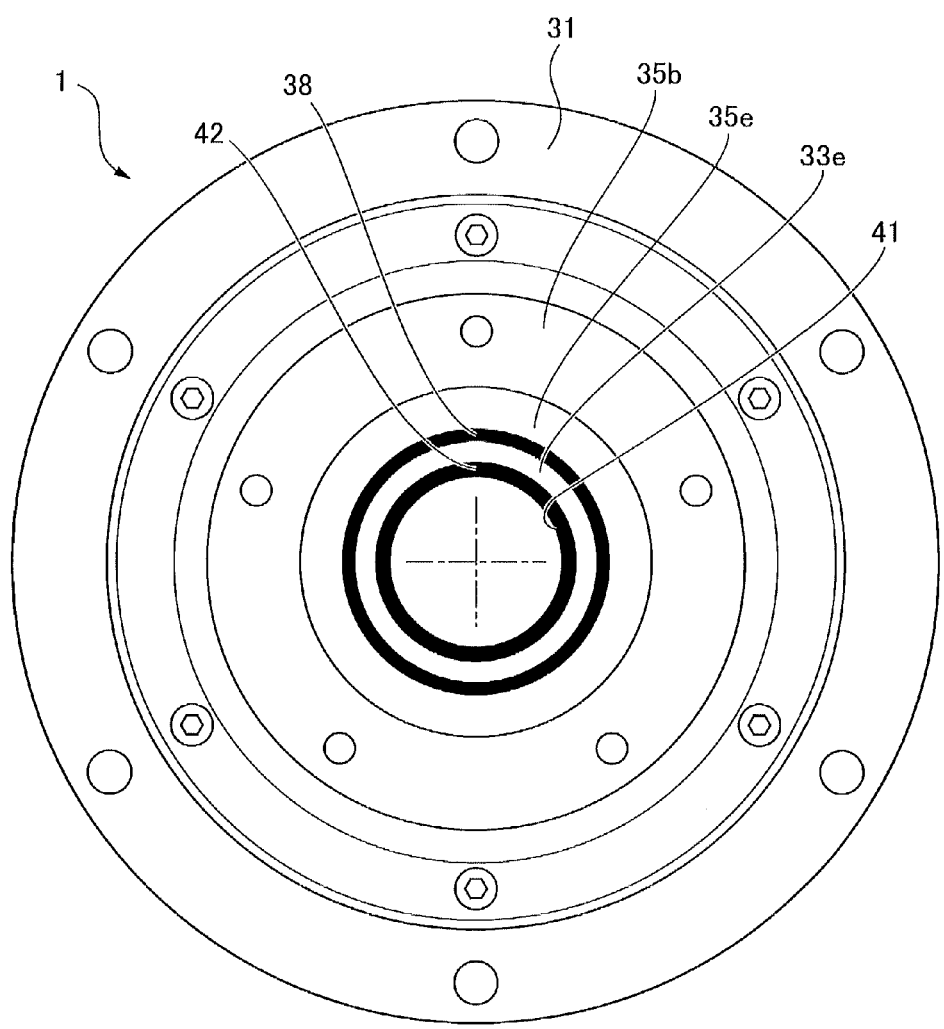
FIG. 1B is an end surface view of the front side of the hollow rotating actuator of FIG. 1A.

FIG. 1A is a schematic longitudinal cross-sectional view of a hollow rotating actuator, and FIG. 1B is an end surface view of the front side thereof. The hollow rotating actuator 1 (referred to below simply as the "actuator 1") comprises a hollow motor 2, e.g. a hollow AC servomotor, and a cup-shaped hollow wave gear device 3. The hollow motor 2 and the hollow wave gear device 3 are disposed coaxially and adjacent in a direction of the actuator center axis 1*a* (a device axial direction 1*a*). In the description below, the hollow wave gear device 3 is used as a reduction drive, and the hollow wave gear device 3 is sometimes referred to simply as the "reduction drive 3."

The hollow motor 2 comprises a cylindrical motor housing 21 and a hollow motor shaft 22 disposed coaxially on the inner side of the housing. The hollow motor shaft 22 is capable of rotating about the actuator center axis 1*a*. A large-diameter shaft 22*a* is formed in the axially middle portion of the hollow motor shaft 22, and an annular drive magnet 23 is mounted to the external periphery of the large-diameter shaft 22*a*. A motor rotor is configured from the large-diameter shaft 22*a* and the drive magnet 23. An annular drive coil 24 is mounted to the internal periphery of the cylindrical part 21*a* of the motor housing 21. A motor stator is configured by the cylindrical part 21*a* and the drive coil 24.

A cylindrical encoder case 25 having the same outside diameter as the cylindrical part 21*a* of the motor housing 21 is fixed to the rear end thereof. The rear end of the encoder case 25 is sealed shut by a case end plate 25*a*. An actuator rear end surface 1*b* is defined by the outside end surface of the case end plate 25*a*. Inside the encoder case 25, an encoder mechanism 26 is incorporated between the encoder case 25 and the rear-end shaft part 22*b* of the hollow motor shaft 22. Rotational information such as the origin position and rotational angle position of the hollow motor shaft 22 is obtained by the encoder mechanism 26.

A center through-hole 21*c* is formed in an end plate 21*b* on the front side of the motor housing 21. A shaft end part 22*c* at the distal end side of the hollow motor shaft 22 protrudes forward in the actuator through the center through-hole 21*c*. The hollow motor shaft 22 is rotatably supported by a front main bearing 27 mounted to the internal peripheral surface of the center through-hole 21*c* of the endplate 21*b*. The hollow motor shaft 22 is also rotatably supported by a rear main bearing 29 mounted to the internal peripheral surface of an encoder support plate 28, which is fixed to the internal peripheral surface of the encoder case 25.

The reduction drive 3 comprises an annular device housing 31, a rigid internally toothed gear 32 fixed to the internal periphery thereof, a cup-shaped flexible externally toothed gear 33 disposed on the inner side of the internally toothed gear, and a wave generator 34 disposed on the inner side of the externally toothed gear. The flexible externally toothed gear 33 is rotatably supported by the device housing 31 via a cross roller bearing 35. The device housing 31 is composed of an aluminum-based material, for example. The rigid internally toothed gear 32, the flexible externally toothed gear, the wave generator 34, and the cross roller bearing 35 are composed of an iron-based material, for example.

The device housing 31 is fixed in a fastened manner by a fastening bolt 36 (showed by the single dash line in the drawing) to the external peripheral portion of the front end surface of the end plate 21*b* of the motor housing 21. The rigid internally toothed gear 32, composed of an iron-based material, is integrally cast in the internal periphery of the device housing 31.

The cup-shaped flexible externally toothed gear 33 comprises a cylindrical barrel part 33*a* opening rearward in the actuator, a diaphragm 33*b* extending inward from the end of the cylindrical barrel part 33*a* at the front side of the actuator, an annular rigid boss 33*c* extending forward as a continuation of the internal peripheral edge of the diaphragm 33*b*, and external teeth 33*d* formed in the external peripheral surface portion of the cylindrical barrel part 33*a* in the side having the open end.

Inside the cylindrical barrel part 33*a* of the flexible externally toothed gear 33, the shaft end part 22*c* of the hollow motor shaft 22 extends from the side having the open end. The wave generator 34 is fixed to the external periphery of the shaft end part 22*c*. The wave generator 34 comprises a cylindrical rigid plug 34*a*, and a wave bearing 34*b* mounted to the external periphery thereof. The rigid plug 34*a* comprises a plug main body 34*c* having an ellipsoidal external peripheral surface fixed to the external periphery of the shaft end part 22*c*, and a cylindrical part 34*d* extending forward from the internal peripheral edge portion of the front end of the plug main body 34*c*. The inside diameter of the cylindrical part 34*d* is substantially equal to the inside diameter of the shaft end part 22*c* of the hollow motor shaft 22.

The wave bearing 34*b* is a ball bearing having a flexible inner race and outer race, and is made to flex into an ellipsoidal shape by the ellipsoidal plug main body 34*c*. The portion where the external teeth 33*d* of the flexible externally toothed gear 33 are formed is made to flex into an ellipsoidal shape by the wave generator 34, and the external teeth 33*d* mesh with the internal teeth 32*a* of the rigid internally toothed gear 32 at two locations in the major axis direction of the ellipse.

The cross roller bearing 35 comprises an outer race 35*a* fixed to the device housing 31, an inner race 35*b* fixed to the boss 33*c* of the flexible externally toothed gear 33, and a plurality of rollers 35*c* inserted in between the outer race 35*a* and the inner race 35*b*. Together with a lip seal 40, the outer race 35*a* is fastened and fixed to the internal peripheral edge of the annular end surface in the front side of the device housing 31 by a fastening bolt 37.

The inner race 35*b* of the cross roller bearing 35 is an annular member, and the internal peripheral side portion of an annular end surface 35*d* in the front side thereof is a circular recessed surface 35*e* that is slightly recessed. The boss 33*c* is mounted from the rear side in a center through-hole 35*f* opening in the center portion of the recessed surface 35*e*. The recessed surface 35*e* and an annular end surface 33*e* in the front side of the boss 33*c*, which are positioned in the same plane, define the internal peripheral portion of the actuator front end surface (the device end surface) 1*c*.

The rear side portion of the inner race 35*b* forms a roller trajectory with the outer race 35*a*, and the rollers 35*c* are inserted therein in a rollable state. The internal peripheral surface of this rear side portion opposes the cylindrical barrel part 33*a* of the cup-shaped flexible externally toothed gear 33 from the outside across a certain gap.

The inner race 35*b* and the boss 33*c* are fixed to each other by a first laser welded part 38. Specifically, between the circular internal peripheral surface of the center through-hole 35*f* of the inner race 35*b* and the circular external peripheral surface of the boss 33*c*, a laser welded part 38 as the first welded part extending around the entire periphery is formed in the region of the circular internal peripheral surface and the circular external peripheral surface on the side having the recessed surface 35*e* of the inner race and the annular end surface 33*e* of the boss, which is exposed in the actuator front end surface 1c. The first welded part can also be a welded part other than a laser welded part. The inner race 35b and the boss 33c are firmly fixed to each other by the first laser welded part 38. The internal peripheral surface of the inner race 35b and the external peripheral surface of the boss 33c are also sealed together in a liquid-tight state by the first laser welded part 38, which is an full-circle welded part. Oil is thereby prevented from leaking from between these components.

Next, a sleeve 41 extends through the hollow part of the hollow motor shaft 22, the hollow part of the wave generator 34, and the hollow part of the boss 33c. An actuator hollow part opening in the actuator front end surface 1c and the actuator rear end surface 1b is formed by a hollow part 41a of the sleeve 41.

A laser welded part 42 as a second laser welded part extending around the entire periphery is formed between the internal peripheral surface of the boss 33c and the external peripheral surface of a front end part 41b exposed in the actuator front end surface 1c of the sleeve 41. The second welded part can also be a welded part other than a laser welding. The front end of the sleeve 41 is fixed to the boss 33c by the laser welded part 42. The internal peripheral surface of the boss 33c and the external peripheral surface of the sleeve 41 are sealed together in a liquid-tight state by the second laser welded part 42, which is a full-circle welded part. Oil is thereby prevented from leaking from between these components.

The rear end 41c of the sleeve 41, which is exposed in the actuator rear end surface 1b, and the case end plate 25a defining the actuator rear end surface 1b are sealed together by a first oil seal 51. The front end plate 21b of the motor housing 21 and the hollow motor shaft 22 are sealed together by a second oil seal 52. Furthermore, the rigid plug 34a and the boss 33c are sealed together by a third oil seal 53.

The mounted part of the third oil seal 53 is configured as follows. An annular outer seal mount 54 is attached to the end surface 33f of the boss 33c in the rear side of the actuator. The cylindrical part 34d extends forward in the actuator along the external peripheral surface of the sleeve 41 from the end surface of the rigid plug 34a in the front side of the actuator. The cylindrical part 34d functions as an inner seal mount. The third oil seal 53 is mounted between these components.

Therefore, oil is prevented from leaking from the side having the drive 3 into the actuator hollow part 41a by the first and third oil seals 51, 53 and the sleeve 41. Oil is also prevented from leaking from the side having the reduction drive 3 into the hollow motor 2 by the second oil seal 52. Furthermore, oil is prevented from leaking into the side having the actuator front end surface 1c by the first and second laser welded parts 38, 42.

OTHER EMBODIMENTS

Figure 2:
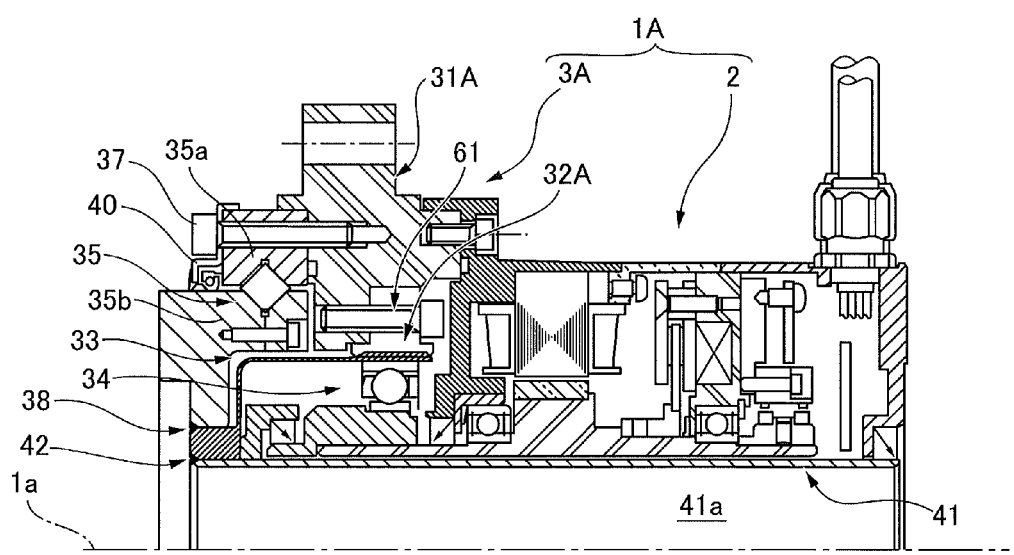
FIG. 2 is a schematic cross-sectional view showing a modification of the hollow rotating actuator of FIG. 1A.

FIG. 2 is a schematic longitudinal cross-sectional view showing a modification of the hollow rotating actuator 1 described above, and only the top half thereof is shown. The basic configuration of the hollow rotating actuator 1A of the present modification is the same as that of the hollow rotating actuator 1 of FIG. 1, and the same symbols therefore denote corresponding regions, while descriptions thereof are omitted.

In the hollow rotating actuator 1A, a rigid internally toothed gear 32A of a reduction drive 3A is fastened and fixed to a device housing 31A by a fastening bolt 61. The outer race 35a of the cross roller bearing 35 is fixed to the device housing 31 by a fastening bolt 37, in the same manner as is shown in FIG. 1A.

The boss 33c of the flexible externally toothed gear 33 is fixed to the inner race 35b of the cross roller bearing 35 by laser welding. Therefore, the number of steps for machining these components can be reduced, and the work of assembling these components is easier.

Figure 3:
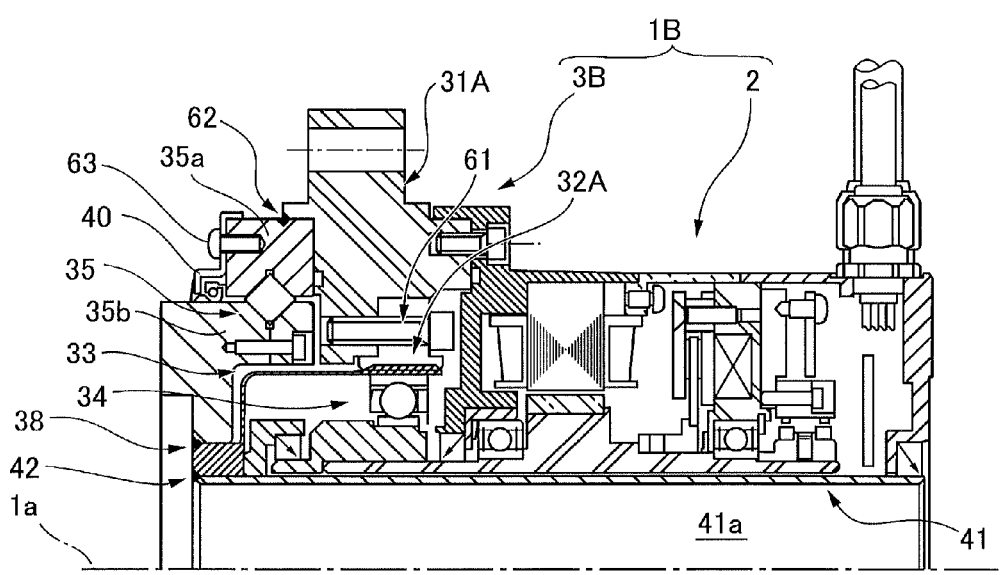
FIG. 3 is a schematic cross-sectional view showing a modification of the hollow rotating actuator of FIG. 1A.

Next, FIG. 3 is a schematic longitudinal cross-sectional view showing another modification of the hollow rotating actuator 1 shown in FIG. 1; only the top half thereof is shown. The basic configuration of the hollow rotating actuator 1B of the present modification is the same as that of the hollow rotating actuator 1 of FIG. 1, and the same symbols therefore denote corresponding regions, while descriptions thereof are omitted.

In the hollow rotating actuator 1B, a rigid internally toothed gear 32A of a drive 3B is fastened and fixed to a device housing 31A by a fastening bolt 61. The outer race 35a of the cross roller bearing 35 is fixed to the drive housing 31A by a laser welded part 62 formed along the external peripheral surface thereof. The lip seal 40 disposed in the end surfaces of the outer race 35a and inner race 35b in the front side of the actuator is fixed to the outer race 35a by a fastening bolt 63. Laser welding of the drive housing 31A and the outer race 35a can be employed when the materials thereof are suitable for welding. By using laser welding, the work of assembling the outer race 35a in the drive housing 31A is made easier.

Additionally, the boss 33c of the flexible externally toothed gear 33 is fixed to the inner race 35b of the cross roller bearing 35 by laser welding, and the outer race 35a of the cross roller bearing 35 is also fixed to the device housing 31A by laser welding. Therefore, the number of steps for machining these components can be reduced, and the work of assembling these components is easier.

Next, in the above example, the cross roller bearing 35 is used. Instead of the cross roller bearing 35, another type of bearing, such as single-row or multiple-row ball bearings, can also be used.

In the above example, the present invention is applied to a hollow rotating actuator. The present invention can be similarly applied to the wave gear device alone as well. For example, in the hollow wave gear device 3 incorporated in the rotating actuators 1, 1A described above, the boss of the flexible externally toothed gear can be fixed to the inner race of the bearing by laser welding. The present invention can of course also be similarly applied to wave gear devices used in applications other than reduction drives, e.g., overdrives, phase modulators, and the like.

Furthermore, in the above example, laser welded parts are formed. Instead of laser welding, electron beam welding can be used, wherein welding is performed in a vacuum. Common arc welding can also be used, and depending on the situation, laser welding and arc welding can be used together.

The invention claimed is:
1. A wave gear device, comprising:
a rigid internally toothed gear;
a flexible externally toothed gear;
a wave generator;
a bearing for rotatably supporting the flexible externally toothed gear on the rigid internally toothed gear;
a first welded part for fixing a rigid boss in the flexible externally toothed gear to an inner race of the bearing, the first welded part being a full-circle welded part in which the boss and the inner race are sealed together in a liquid-tight state;
a first hollow part extending through the wave generator along the device axial direction;
a second hollow part extending along the device axial direction;
a sleeve disposed passing through the first and second hollow parts; and
a second welded part for fixing the sleeve to the boss, the second welded part being a full-circle welded part in which the sleeve and the boss are sealed together in a liquid-tight state, wherein
the boss of the flexible externally toothed gear is mounted on the inner race center through-hole of the inner race so that an end surface of the boss is exposed outside in a device axial direction through the inner race center through-hole;
the first welded part is formed on an external peripheral surface of the boss on the end surface of the boss; and
the second welded part is formed on the end surface of the boss.

2. The wave gear device according to claim 1, wherein the first welded part is a laser welded part.

3. A wave gear device, comprising:
a rigid internally toothed gear;
a flexible externally toothed gear;
a wave generator;
a bearing for rotatably supporting the flexible externally toothed gear on the rigid internally toothed gear;
a first welded part for fixing a rigid boss in the flexible externally toothed gear to an inner race of the bearing, the first welded part being a full-circle welded part in which the boss and the inner race are sealed together in a liquid-tight state;
a device housing; and
an inner race center through-hole formed in the inner race of the bearing, wherein:
  the rigid internally toothed gear is fixed to an internal periphery of the device housing;
  the flexible externally toothed gear is disposed inside the rigid internally toothed gear and is rotatably supported on the device housing via the bearing;
  the wave generator is disposed inside the flexible externally toothed gear;
  the boss of the flexible externally toothed gear is mounted on the inner race center through-hole of the inner race so that an end surface of the boss is exposed outside in a device axial direction through the inner race center through-hole; and
  the first welded part is formed around an entire periphery in a region between an internal peripheral surface of the inner race and an external peripheral surface of the boss on the end surface of the boss; and wherein
the wave gear device further comprising:
a first hollow part extending through the wave generator along the device axial direction;
a second hollow part extending along the device axial direction;
a sleeve disposed passing through the first and second hollow parts; and
a second welded part for fixing the sleeve to the boss, wherein
the second welded part is a full-circle welded part wherein the sleeve and the boss are sealed together in a liquid-tight state, and is formed on the end surface of the boss.

4. A hollow rotating actuator, comprising:
a motor disposed in an actuator rear side; and
a wave gear device disposed in an actuator front side,
the motor and the wave gear device being disposed coaxially, wherein:
  the motor has a motor housing and a hollow motor shaft protruding to the actuator front side from a front end plate of the motor housing;
  the wave gear device has a device housing fixed to the motor housing, a bearing, a rigid internally toothed gear fixed to an internal periphery of the device housing, a flexible externally toothed gear disposed inside the rigid internally toothed gear and rotatably supported in the device housing via the bearing, and a wave generator disposed inside the flexible externally toothed gear;
  the flexible externally toothed gear has a cylindrical barrel part having an open end in a motor side, a diaphragm extending radially inward from an end of the cylindrical barrel part on a side opposite the open end, an annular rigid boss formed in an internal peripheral edge of the diaphragm, and external teeth formed in an external peripheral surface portion of the cylindrical barrel part on a side of the open end;
  a shaft distal end of the hollow motor shaft protruding forward from the front end plate extends into the cylindrical barrel part of the flexible externally toothed gear;
  the wave generator has a cylindrical rigid plug fixed to an external periphery of the shaft distal end;
  the bearing has an outer race fixed to an end of the device housing on the actuator front end side, and an inner race having a center through-hole in which the boss is mounted;
  an annular end surface of the inner race on an actuator front end side and an annular end surface of the boss on the actuator front end side are both exposed in the actuator front end side;
  a first laser welded part is formed around an entire periphery between an internal peripheral surface of the inner race and an external peripheral surface of the boss in a region on the actuator front end side;
  the boss is fixed to the inner race by the first laser welded part; and
  the internal peripheral surface of the inner race and the external peripheral surface of the boss are sealed together in a liquid-tight state by the first laser welded part, and wherein
the hollow rotating actuator further comprising:
a sleeve passing through a hollow part of the hollow motor shaft, a hollow part of the boss, and a hollow part of the wave generator, and extending from an actuator front end surface to an actuator rear end surface; and
a second laser welded part, wherein:
  an internal peripheral surface of the sleeve defines an actuator hollow part;
  the second laser welded part is formed around an entire periphery between an external peripheral surface of a front end part of the sleeve and an internal peripheral surface of the boss, the front end part being exposed in the actuator front end;
  the front end part of the sleeve is fixed to an end surface of the boss by the second laser welded part; and
  the external peripheral surface of the front end part and the internal peripheral surface of the boss are sealed together in a liquid-tight state by the second laser welded part.

5. The hollow rotating actuator according to claim 4, further comprising:
- a first oil seal for sealing together a rear end part of the sleeve exposed on the actuator rear end side, and the motor housing rear end plate defining the actuator rear end;
- a second oil seal for sealing together the front end plate of the motor housing and the hollow motor shaft; and
- a third oil seal for sealing together the rigid plug and the boss.

6. The hollow rotating actuator according to claim 5, further comprising:
- an annular outer seal mount attached to an end surface of the boss on the actuator rear end side; and
- a cylindrical inside seal mount extending forward in the actuator front end side along an external peripheral surface of the sleeve from an end surface of the rigid plug on the actuator front end side;
- the third oil seal being mounted between the outer seal mount and the inner seal mount.

* * * * *